US009540717B2

(12) United States Patent
Nakata et al.

(10) Patent No.: US 9,540,717 B2
(45) Date of Patent: Jan. 10, 2017

(54) HIGH STRENGTH HOT-ROLLED STEEL SHEET FOR WELDED STEEL LINE PIPE HAVING EXCELLENT SOURING RESISTANCE, AND METHOD FOR PRODUCING SAME

(75) Inventors: Hiroshi Nakata, Tokyo (JP); Tomoaki Shibata, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 407 days.

(21) Appl. No.: 14/129,776

(22) PCT Filed: Jun. 27, 2012

(86) PCT No.: PCT/JP2012/067024
§ 371 (c)(1),
(2), (4) Date: Apr. 3, 2014

(87) PCT Pub. No.: WO2013/002413
PCT Pub. Date: Jan. 3, 2013

(65) Prior Publication Data
US 2014/0216609 A1    Aug. 7, 2014

(30) Foreign Application Priority Data
Jun. 30, 2011  (JP) ................................. 2011-145823

(51) Int. Cl.
*C22C 38/02* (2006.01)
*C22C 38/04* (2006.01)
*C22C 38/06* (2006.01)
*C22C 38/08* (2006.01)
*C22C 38/12* (2006.01)
*C22C 38/14* (2006.01)
*C22C 38/16* (2006.01)
*C22C 38/24* (2006.01)
*C22C 38/26* (2006.01)
*C22C 38/28* (2006.01)
*C21D 6/00* (2006.01)
*C21D 8/02* (2006.01)
*C22C 38/00* (2006.01)
*F16L 9/02* (2006.01)
*F16L 9/16* (2006.01)

(52) U.S. Cl.
CPC ................ *C22C 38/28* (2013.01); *C21D 6/00* (2013.01); *C21D 6/005* (2013.01); *C21D 8/0226* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/24* (2013.01); *C22C 38/26* (2013.01); *F16L 9/02* (2013.01); *F16L 9/165* (2013.01); *C21D 2211/002* (2013.01); *C21D 2211/005* (2013.01)

(58) Field of Classification Search
CPC .... C22C 38/001; C22C 38/002; C22C 38/005; C22C 38/02; C22C 38/04; C22C 38/06; C22C 38/08; C22C 38/12; C22C 38/14; C22C 38/16; C22C 38/24; C22C 38/26; C22C 38/28; C21D 6/00; C21D 6/005; C21D 8/0226; C21D 8/0263; C21D 2211/002; C21D 2211/005
USPC ....... 148/505, 330, 331, 332, 333, 336, 337; 420/83, 89, 93, 104, 119, 121, 124, 125, 420/126, 127, 128
See application file for complete search history.

(56) References Cited

U.S. PATENT DOCUMENTS

| | | | | |
|---|---|---|---|---|
| 5,989,366 A * | 11/1999 | Hayashi | ................... | C22C 38/04 148/505 |
| 6,818,079 B2 * | 11/2004 | Inoue | ................... | C21D 8/0226 148/541 |
| 7,501,030 B2 * | 3/2009 | Nakata | ................... | C22C 38/02 148/320 |
| 7,879,287 B2 * | 2/2011 | Kobayashi | ........... | C21D 8/0226 420/126 |
| 8,784,577 B2 * | 7/2014 | Kami | ................... | C22C 38/02 148/333 |

(Continued)

FOREIGN PATENT DOCUMENTS

| | | | |
|---|---|---|---|
| EP | 0 796 921 A1 | 9/1997 | |
| EP | 2 309 014 A1 | 4/2011 | |

(Continued)

OTHER PUBLICATIONS

English translation of the Written Opinion of the International Search Report mailed Oct. 2, 2012, for PCT/JP 2012/067024; 5 pages.*

(Continued)

*Primary Examiner* — Helene Klemanski
(74) *Attorney, Agent, or Firm* — RatnerPrestia

(57) ABSTRACT

A steel material containing 0.01% to 0.07% C, 0.40% or less Si, 0.5% to 1.4% Mn, 0.1% or less Al, 0.01% to 0.15% Nb, 0.1% or less V, 0.03% or less Ti, and 0.008% or less N on a mass basis, Nb, V, and Ti satisfying Nb+V+Ti<0.15, Cm satisfying 0.12 or less, is heated to a heating temperature of 1,100° C. to 1,250° C., finish-rolled in such a way that the accumulative rolling reduction at a temperature of 930° C. or lower is 40% to 85% and the finished rolling temperature is 760° C. to 870° C., cooled to a cooling stop temperature of 500° C. or lower in terms of surface temperature at an average cooling rate of 30° C./s to 200° C./s in terms of thickness-wise center temperature, naturally cooled for more than 10 s after cooling is stopped, and coiled at a coiling temperature of 400° C. to 620° C.

8 Claims, No Drawings

(56) References Cited

U.S. PATENT DOCUMENTS

| | | | | |
|---|---|---|---|---|
| 2009/0025835 A1* | 1/2009 | Hara | ................... | C22C 38/02 |
| | | | | 148/330 |
| 2011/0126944 A1* | 6/2011 | Kami | ................... | C21D 8/0226 |
| | | | | 148/332 |
| 2011/0284137 A1* | 11/2011 | Kami | ................... | C21D 8/0263 |
| | | | | 148/332 |
| 2012/0018056 A1* | 1/2012 | Nakagawa | ............ | C21D 8/0263 |
| | | | | 148/330 |
| 2013/0000793 A1* | 1/2013 | Ishikawa | .............. | C21D 8/0226 |
| | | | | 148/332 |

FOREIGN PATENT DOCUMENTS

| | | | |
|---|---|---|---|
| JP | 05-255746 | A | 10/1993 |
| JP | 11-080833 | A | 3/1999 |
| JP | 2005-240051 | A | 9/2005 |
| JP | 2008-56962 | A | 3/2008 |
| JP | 2010-196156 | A | 9/2010 |
| JP | 2010-196161 | A | 9/2010 |
| JP | 2010-196165 | A | 9/2010 |
| JP | 2011-17061 | A | 1/2011 |
| WO | WO 2010/087511 | A1 | 8/2010 |
| WO | WO 2010/087512 | A1 | 8/2010 |

OTHER PUBLICATIONS

International Search Report dated Oct. 2, 2012, application No. PCT/JP2012/067024.
Supplementary European Search Report for Application No. EP 12 80 3542 dated Jun. 24, 2015.

* cited by examiner

HIGH STRENGTH HOT-ROLLED STEEL SHEET FOR WELDED STEEL LINE PIPE HAVING EXCELLENT SOURING RESISTANCE, AND METHOD FOR PRODUCING SAME

CROSS REFERENCE TO RELATED APPLICATIONS

This is the U.S. National Phase application of PCT/JP2012/067024, filed Jun. 27, 2012, which claims priority to Japanese Patent Application No. 2011-145823, filed Jun. 30, 2011, the disclosures of each of these applications being incorporated herein by reference in their entireties for all purposes.

TECHNICAL FIELD OF THE INVENTION

The present invention relates to a hot-rolled steel sheet for welded steel tubes suitable as line pipes for transporting natural gas, crude oil, or the like and particularly relates to the enhancement of sour resistance.

BACKGROUND OF THE INVENTION

In recent years, crude oil and natural gas have been being actively mined in severe corrosion environments, which have been withdrawn from development, because of soaring crude oil prices, needs for the diversification of energy sources, and the like. Crude oil and natural gas are actively mined in oil and gas fields in humid environments containing hydrogen sulfide, carbon dioxide, chlorine ions, and/or the like or in frigid locations such as North Sea, Canada, and Alaska. Pipelines for transporting mined crude oil or natural gas are under active construction.

Pipelines tend to be operated at high pressure with large diameter for an increase in transport efficiency. In order to endure the high-pressure operation of such pipelines, transport pipes (line pipes) need to be thick steel pipes and UOE steel pipes made from thick steel plates have been used. However, high-strength welded steel tubes made from coiled hot-rolled steel sheets (hot-rolled steel strips) are high in productivity, are more inexpensive, and therefore have been recently used as transport pipes instead of such UOE steel pipes made from thick steel plates in accordance with strong needs to further reduce construction costs of pipelines. These high-strength welded steel tubes need to have excellent low-temperature toughness from the viewpoint of preventing the destruction of pipelines and further need to be excellent in so-called sour resistance including hydrogen-induced cracking resistance (HIC resistance) and stress corrosion cracking resistance in addition to these properties.

In order to cope with these needs, for example, Patent Literature 1 proposes a "method for manufacturing a steel sheet for steel tubes having excellent sour resistance". A technique described in Patent Literature 1 is a method, for manufacturing a steel sheet for steel tubes having excellent sour resistance, including finishing the hot rolling of a continuously cast product containing 0.04% to 0.16% C, 0.6% to 1.8% Mn, one or more of 0.06% or less Nb, 0.07% or less V, 0.03% or less Ti, 0.50% or less Mo, and 0.50% or less Cr, and about 0.3% or less Si at a temperature of 750° C. or lower; immediately performing quenching by cooling to a temperature of 200° C. or lower at an average cooling rate of 20° C./s to 80° C./s; and then performing tempering at 450° C. to 750° C. According to the technique disclosed in Patent Literature 1, a high-strength hot-rolled steel sheet, dramatically enhanced in sour resistance, having a tensile strength of 540 MPa or more is obtained.

Furthermore, Patent Literature 2 proposes a "method for manufacturing a steel sheet for high-strength line pipes having excellent HIC resistance". A technique described in Patent Literature 2 is a method, for manufacturing a steel sheet, including heating a semi-finished product which contains 0.03% to 0.08% C, 0.05% to 0.50% Si, 1.0% to 1.9% Mn, 0.005% to 0.05% Nb, 0.005% to 0.02% Ti, 0.01% to 0.07% Al, and 0.0005% to 0.0040% Ca and which satisfies a Ceq of 0.32% or more to 1,000° C. to 1,200° C.; performing two-stage cooling comprising accelerated cooling to a surface temperature of 500° C. or lower after hot rolling is finished; interrupting accelerated cooling once so that the surface is reheated to a surface temperature of 500° C. or higher; and then performing cooling to a temperature of 600° C. or lower at a cooling rate of 3° C./s to 50° C./s. According to the technique disclosed in Patent Literature 2, a steel sheet which exhibits excellent HIC resistance and SSC resistance even in sour environments and which has a high strength equivalent to X70 or higher is obtained.

Furthermore, Patent Literature 3 proposes a "method for manufacturing a hot-rolled steel sheet for sour-resistant high-strength electric resistance welded steel pipes". A technique described in Patent Literature 3 is a method, for manufacturing a steel sheet for hot-rolled steel sheet for sour-resistant high-strength electric resistance welded steel pipes, including heating a semi-finished product which contains 0.02% to 0.06% C, 0.05% to 0.50% Si, 0.5% to 1.5% Mn, 0.01% to 0.10% Al, 0.01% to 0.10% Nb, 0.001% to 0.025% Ti, 0.001% to 0.005% Ca, 0.003% or less O, 0.005% or less N, and one or more selected from the group consisting of 0.01% to 0.10% V, 0.01% to 0.50% Cu, 0.01% to 0.50% Ni, and 0.01% to 0.50% Mo and which satisfies $Px=[C]+[Si]/30+([Mn]+[Cu])/20+[Ni]/30+[Mo]/7+[V]/10 \leq 0.17$ and $Py\{[Ca]-(130\times[Ca]+0.18)\times[O]\}/(1.25\times[S])=1.2$ to 3.6 to 1,200° C. to 1,300° C.; performing hot rolling at a finished rolling temperature not lower than (the Ar3 transformation point minus 50° C.); immediately starting cooling; performing coiling at a temperature of 700° C. or lower; and then performing slow cooling. According to the technique disclosed in Patent Literature 3, an electric resistance welded steel pipe with a high strength equivalent to Grade X60 or higher can be manufactured, a hot-rolled steel sheet with a thickness of 12.7 mm or more can be obtained, and an electric resistance welded steel pipe with high weld toughness can be manufactured using the hot-rolled steel sheet.

PATENT LITERATURE

PTL 1: Japanese Unexamined Patent Application Publication No. 05-255746
PTL 2: Japanese Unexamined Patent Application Publication No. 11-80833
PTL 3: Japanese Unexamined Patent Application Publication No. 2005-240051

SUMMARY OF THE INVENTION

In the technique described in Patent Literature 1, tempering is essential and therefore there is a problem in that steps are complicated and production efficiency is low. In the technique described in Patent Literature 2, interrupting accelerated cooling and reheating to a predetermined temperature are essential requirements, a long cooling zone and precise accelerated cooling control are necessary, and therefore equipment problems remain. In the technique described in Patent Literature 3, there is a problem in that the hardness of an outermost layer cannot be reduced and good sour resistance is not necessarily achieved.

The present invention solves the problems with the conventional techniques and makes it possible to provide a thick hot-rolled steel sheet having excellent sour resistance. The hot-rolled steel sheet is suitable for welded steel tubes for line pipes capable of transporting highly corrosive crude oil, natural gas, or the like and has a small difference in thickness-wise hardness, a thickness-wise maximum hardness of 220 HV or less, and a yield strength of 450 MPa or more (Grade X65).

The term "thick" is used herein to imply a thickness of 10 mm or more. The term "high strength" as used herein refers to a strength equivalent to Grade X65, that is, a yield strength of 450 MPa (65 ksi) or more.

In order to achieve the above object, the inventors have intensively investigated various factors affecting sour resistance. As a result, the inventors have found that the variation in hardness of a steel sheet, particularly thickness-wise maximum hardness, significantly affect sour resistance and sour resistance is significantly enhanced if the difference in thickness-wise hardness can be reduced and the thickness-wise maximum hardness can be adjusted to 220 HV or less.

The inventors have performed further investigations and have found that a hot-rolled steel sheet having the above properties can be obtained in such a way that the Nb plus V plus Ti content is limited to a predetermined value or less, the content of each contained alloy element is adjusted such that Cm defined by a relational equation specific to the alloy elements is 0.12 or less, natural cooling is performed for a predetermined time or more after cooling subsequent to hot rolling is rapidly performed under specific conditions, and coiling is performed at a predetermined temperature.

The present invention has been completed on the basis of the findings in addition to further investigations. That is, preferred embodiments of the present invention are as described below.

(1) A thick high-strength hot-rolled steel sheet for electric resistance welded line pipe having excellent sour resistance has a composition containing 0.01% to 0.07% C, 0.40% or less Si, 0.5% to 1.4% Mn, 0.015% or less P, 0.003% or less S, 0.1% or less Al, 0.01% to 0.15% Nb, 0.1% or less V, 0.03% or less Ti, and 0.008% or less N on a mass basis, the remainder being Fe and inevitable impurities. Nb, V, and Ti satisfy the following inequality:

$$Nb+V+Ti<0.15 \quad (1)$$

where Nb, V, and Ti are the content (mass percent) of each element. Cm defined by the following equation satisfies 0.12 or less:

$$Cm=C+Si/30+(Mn+Cu)/30+Ni/60+Mo/7+V/10 \quad (2)$$

where C, Si, Mn, Cu, Ni, Mo, and V are the content (mass percent) of each element. The thick high-strength hot-rolled steel sheet has a microstructure containing a bainite phase or bainitic ferrite phase at an area fraction of 95% or more, a thickness-wise maximum hardness of 220 HV or less, and a yield strength of 450 MPa or more.

(2) In the thick high-strength hot-rolled steel sheet for electric resistance welded line pipe specified in Item (1), the composition further contains one or more selected from the group consisting of 0.3% or less Mo, 0.5% or less Cu, 0.5% or less Ni, 0.6% or less Cr, 0.001% or less B, and 0.04% or less Zr on a mass basis.

(3) In the thick high-strength hot-rolled steel sheet for electric resistance welded line pipe specified in Item (1) or (2), the composition further contains one or both of 0.005% or less Ca and 0.005% or less of an REM on a mass basis.

(4) A method for manufacturing a thick high-strength hot-rolled steel sheet for electric resistance welded line pipe having excellent sour resistance and a yield strength of 450 MPa or more includes heating a steel material, subjecting the steel material to hot rolling including rough rolling and finish rolling to manufacture a hot-rolled sheet, cooling the heat-treated sheet after the hot rolling is finished, and then coiling the hot-rolled sheet. The steel material has a composition containing 0.01% to 0.07% C, 0.40% or less Si, 0.5% to 1.4% Mn, 0.015% or less P, 0.003% or less S, 0.1% or less Al, 0.01% to 0.15% Nb, 0.1% or less V, 0.03% or less Ti, and 0.008% or less N on a mass basis, the remainder being Fe and inevitable impurities. Nb, V, and Ti satisfy the following inequality:

$$Nb+V+Ti<0.15 \quad (1)$$

where Nb, V, and Ti are the content (mass percent) of each element. Cm defined by the following equation satisfies 0.12 or less:

$$Cm=C+Si/30+(Mn+Cu)/30+Ni/60+Mo/7+V/10 \quad (2)$$

where Nb, V, Ti, C, Si, Mn, Cu, Ni, Mo, and V are the content (mass percent) of each element. The heating temperature before the hot rolling ranges from 1,100° C. to 1,250° C. The finish rolling is one in which the total rolling reduction at a temperature of 930° C. or lower is 40% to 85% and the finished rolling temperature is 760° C. to 870° C. The cooling is performed to a cooling stop temperature of 500° C. or lower in terms of surface temperature at an average cooling rate of 30° C./s to 200° C./s in terms of thickness-wise center temperature, followed by natural cooling for more than 10 s after the cooling is stopped. The coiling is performed at a coiling temperature of 400° C. to 620° C.

(5) In the method for manufacturing the thick high-strength hot-rolled steel sheet for electric resistance welded line pipe specified in Item (4), the composition further contains one or more selected from the group consisting of 0.3% or less Mo, 0.5% or less Cu, 0.5% or less Ni, 0.6% or less Cr, 0.001% or less B, and 0.04% or less Zr on a mass basis.

(6) In the method for manufacturing the thick high-strength hot-rolled steel sheet for electric resistance welded line pipe specified in Item (4) or (5), the composition further contains one or both of 0.005% or less Ca and 0.005% or less of an REM on a mass basis.

According to the present invention, a thick high-strength hot-rolled steel sheet for electric resistance welded line pipe having excellent sour resistance can be readily manufactured at low cost. The steel sheet has excellent toughness includes a surface layer having low hardness, and has a small variation in hardness regardless of large thickness and high strength. This is industrially particularly advantageous.

DETAILED DESCRIPTION OF EMBODIMENTS OF THE INVENTION

First, reasons for limiting the composition of a thick hot-rolled steel sheet according to embodiments of the present invention are described. The mass percent is simply represented by % unless otherwise specified.

C: 0.01% to 0.07%

C is an element contributing to the increase in strength of the steel sheet. In order to ensure desired high strength, the content thereof needs to be 0.01% or more. However, when the content is more than 0.07%, the hardness of an outermost layer of the steel sheet is high, the variation in hardness of the steel sheet is large, and the uniformity is reduced. Furthermore, the toughness, the corrosion resistance, the weldability, and the like are reduced. Therefore, C is limited to a range between 0.01% and 0.07%. Incidentally, it is preferably 0.025% to 0.06%.

Si: 0.40% or less

Si acts as a deoxidizing agent and forms a solid solution to contribute to the increase in strength of the steel sheet. In order to ensure such effects, the content thereof needs to be 0.01% or more. However, when the content is more than 0.40%, the toughness and the weldability are reduced. Therefore, Si is limited to 0.40% or less. Incidentally, it is preferably less than 0.40% and more preferably 0.3% or less.

Mn: 0.5% to 1.4%

Mn is an element which contributes to the increase in strength of the steel sheet through solid solution strengthening or an increase in hardenability. In order to ensure desired high strength, the content thereof needs to be 0.5% or more. However, when the content is large, more than 1.4%, the sour resistance is reduced. Therefore, Mn is limited to a range between 0.5% and 1.4%. Incidentally, it is preferably 0.7% to 1.1%.

P: 0.015% or less

P is an element which is present in steel in the form of an impurity and which is likely to segregate. Therefore, when the content is large, the toughness is reduced and the sour resistance of the steel sheet is reduced due to significant segregation. Therefore, P is limited to 0.015% or less. Incidentally, it is preferably 0.010% or less.

S: 0.003% or less

S is present in steel in the form of a sulfide and particularly forms elongated MnS to reduce the ductility, the toughness, and the sour resistance. Therefore, S is limited to 0.003% or less. Incidentally, it is preferably 0.001% or less.

Al: 0.1% or less

Al is an element acting as a deoxidizing agent. In order to achieve such an effect, the content thereof needs to be 0.01% or more. However, when the content is large, more than 0.1%, the proportion of remaining inclusions is increased and the cleanliness of steel is reduced. Therefore, Al is limited to 0.1% or less. Incidentally, it is preferably 0.01% to 0.06%.

Nb: 0.01% to 0.15%

Nb is an element which expands the non-recrystallization temperature range in austenite, which contributes to the refining of grains by controlled rolling, and which is effective in increasing the strength and toughness of steel. In addition, Nb forms a carbide to contribute to the increase in strength of the steel sheet through precipitation hardening. In order to achieve such effects, the content needs to be 0.01% or more. However, when the content is more than 0.15%, such effects are saturated and any effect appropriate to the content cannot be expected. Therefore, Nb is limited to a range between 0.01% and 0.15%. Incidentally, it is preferably 0.01% to 0.06%.

V: 0.1% or less

V is an element which forms a solid solution in steel to contribute to the increase in strength of the steel sheet through solid solution hardening and which also forms a carbide to contribute to the increase in strength of the steel sheet through precipitation hardening. In order to achieve such effects, the content thereof needs to be 0.001% or more. However, when the content is more than 0.1%, the strength is excessively increased and therefore the toughness is reduced. Therefore, V is limited to the 0.1% or less. Incidentally, it is preferably 0.08% or less.

Ti: 0.03% or less

Ti is an element which forms a nitride, which suppresses the coarsening of austenite grains to refine grains, and which contributes to an increase in strength and an increase in toughness. In order to achieve such effects, the content thereof needs to be 0.001% or more. However, when the content is more than 0.03%, a carbide of Ti is readily precipitated and therefore negatively affects toughness. Therefore, Ti is limited to 0.03% or less.

N: 0.008% or less

N combines with a nitride-forming element to form a nitride and contributes to the refining of grains. Therefore, the content thereof needs to be 0.001% or more. However, when the content is more than 0.008%, the cracking of a slab occurs. Therefore, N is limited to 0.008% or less. Furthermore, Nb, V, and Ti are contained within the range of the content of the above components and are adjusted so as to satisfy the following inequality:

$$Nb+V+Ti<0.15 \qquad (1)$$

where Nb, V, and Ti are the content (mass percent) of each element.

$$Nb+V+Ti<0.15$$

Nb, V, and Ti are elements which each form a carbonitride, form coarse insoluble carbonitrides, and deteriorate the sour resistance. In the present invention, in order to increase the sour resistance, the total content thereof is preferably limited to less than 0.15. When the total content of Nb, V, and Ti is 0.15 or more, the sour resistance is significantly reduced. Therefore, Nb+V+Ti is limited to less than 0.15. Incidentally, it is preferably 0.13 or less. Furthermore, in the present invention, Cm defined by the following equation is preferably adjusted so as to satisfy 0.12 or less within the range of the content of the above components and the range satisfying Inequality (1):

$$Cm=C+Si/30+(Mn+Cu)/30+Ni/60+Mo/7+V/10 \qquad (2)$$

where C, Si, Mn, Cu, Ni, Mo, and V are the content (mass percent) of each element. Incidentally, in the case of calculating Equation (2), a component which is not contained is set equal to zero.

Cm: 0.12 or less

Cm, which is defined by Equation (2), is a factor which is associated with hardenability and which affects the hardness distribution of the steel sheet, particularly affects the thickness-wise hardness distribution thereof, and has a large influence on the sour resistance particularly in association with the increase in hardness of the vicinity of a surface layer. When Cm is more than 0.12, the maximum hardness in the thickness-wise hardness distribution is increased to more than 220 HV and the sour resistance is reduced. Therefore, Cm is limited to 0.12 or less. Incidentally, it is preferably 0.09 to 0.12.

The above components are fundamental components. In the present invention, the following components are selective elements and may be contained in addition to the fundamental components as required: one or more selected from the group consisting of 0.3% or less Mo, 0.5% or less Cu, 0.5% or less Ni, 0.6% or less Cr, 0.001% or less B, and 0.04% or less Zr and/or one or both of 0.005% or less Ca and 0.005% or less of an REM.

One or more selected from the group consisting of 0.3% or less Mo, 0.5% or less Cu, 0.5% or less Ni, 0.6% or less Cr, 0.001% or less B, and 0.04% or less Zr Mo, Cu, Ni, Cr, B, and Zr are elements which increase the hardenability of steel to contribute to the increase in strength of the steel sheet and may be selectively contained. In order to achieve such an effect, 0.01% or more Mo, 0.01% or more Cu, 0.01% or more Ni, 0.01% or more Cr, 0.0003% or more B, and 0.01% or more Zr are preferably contained. However, when more than 0.3% Mo, more than 0.5% Cu, more than 0.5% Ni, more than 0.6% Cr, more than 0.001% B, and more than 0.04% Zr are contained, the strength is increased and the sour resistance is reduced. Therefore, when being contained, Mo, Cu, Ni, Cr, B, and Zr are preferably limited to 0.3% or less, 0.5% or less, 0.5% or less, 0.6% or less, 0.001% or less, and 0.04% or less, respectively.

One or both of 0.005% or less Ca and 0.005% or less of REM

Ca and the REM are elements which control the morphology of sulfides in steel to contribute to an increase in sour resistance and may be contained as required. In order to achieve such an effect, 0.001% or more Ca and 0.001% or more of the REM are preferably contained. However, when more than 0.005% Ca and more than 0.005% of REM are contained, such effects are saturated and the ductility is reduced instead. Therefore, when being contained, Ca and the REM are preferably limited to 0.005% or less respectively.

The remainder other than those described above are Fe and inevitable impurities.

Reasons for limiting the microstructure of the hot-rolled steel sheet according to embodiments of the present invention are described below.

The microstructure of the thick hot-rolled steel sheet according to the present invention preferably contains a bainite phase or a bainitic ferrite phase at an area fraction of 95% or more.

In the thick hot-rolled steel sheet according to an embodiment of the present invention, the microstructure contains the bainite phase or the bainitic ferrite phase, that is, a primary phase at an area fraction of 95% or more and more preferably 97% or more. Since the primary phase is the bainite phase or the bainitic ferrite phase, desired high strength can be held and high toughness can be ensured. From the viewpoint of increasing the sour resistance, a single phase, that is, the bainite phase or the bainitic ferrite phase only is preferred. The term "primary phase" as used herein refers to a phase having an area fraction of 95% or more. Incidentally, a secondary phase other than the primary phase may possibly be pearlite, martensite, or the like. If the secondary phase is present, the area fraction thereof is less than 5% and therefore the negative influence thereof on sour resistance is little.

The thick hot-rolled steel sheet according to an embodiment of the present invention has the above composition, the above microstructure, a thickness-wise maximum hardness of 220 HV or less, a strength equivalent to Grade X65, that is, a yield strength of 450 MPa (65 ksi) or more, and a thickness of 10 mm or more.

A preferred method for manufacturing the thick hot-rolled steel sheet according to the present invention is described below.

A steel material having the above composition is used as a starting material. A method for producing the steel material need not be particularly limited and may be any known method. The steel material is preferably produced in such a way that, for example, molten steel having the above composition is produced by a common steelmaking process using a converter or the like, is further subjected to degassing or the like, and is then cast into the steel material, such as a slab, by a common casting process such as a continuous casting process.

The steel material, which is a starting material, is charged into a furnace or the like, is heated to a predetermined temperature, and is then subjected to hot rolling including rough rolling and finish rolling, whereby a hot-rolled sheet is obtained. The hot-rolled sheet is immediately cooled and is then coiled.

The heating temperature of the steel material is preferably 1,000° C. to 1,250° C. When the heating temperature is lower than 1,000° C., carbonitrides in the steel are not sufficiently dissolved because of the low heating temperature and hot rolling may became difficult due to high deformation resistance. In contrast, when the heating temperature is higher than 1,250° C., grains are coarsened and the toughness of the steel sheet is reduced. Therefore, the heating temperature is limited to a range between 1,000° C. and 1,250° C.

The steel material heated at the above heating temperature is subjected to hot rolling including rough rolling and finish rolling, whereby the hot-rolled sheet is obtained.

Conditions for rough rolling need not be particularly limited and may be set such that a sheet bar with a predetermined size and form can be obtained. A roughly rolled sheet bar is then finish-rolled. Finish rolling is one in which the accumulative rolling reduction at a temperature of 930° C. or lower is 40% to 85% and the finished rolling temperature is 760° C. to 870° C.

When the finished rolling temperature is lower than 760° C., processed ferrite remains on a surface layer and therefore the sour resistance is reduced. In contrast, when the finished rolling temperature is higher than 870° C., rolling strain is relieved, formed ferrite grains are coarsened, and the toughness is reduced. Therefore, the finished rolling temperature is limited to a range between 760° C. and 870° C.

When the accumulative rolling reduction at a temperature of 930° C. or lower is less than 40%, the toughness is reduced. In contrast, when the accumulative rolling reduction at a temperature of 930° C. or lower is more than 85%, a banded microstructure is formed and therefore the toughness is reduced. Therefore, the accumulative rolling reduction at a temperature of 930° C. or lower is limited to a range between 40% and 85%.

After hot rolling is finished, the hot-rolled sheet is cooled. Cooling subsequent to hot rolling is as follows: the hot-rolled sheet is cooled to a cooling stop temperature of 500° C. or lower in terms of surface temperature at an average cooling rate of 30° C./s to 200° C./s in terms of thickness-wise center temperature and is naturally cooled for more than 10 s after cooling is stopped.

When the average cooling rate is less than 30° C./s, the formation of a ferrite phase is observed and a desired microstructure in which a bainite phase or a bainitic ferrite phase is a primary phase cannot be formed. In contrast, when quenching is performed at a rate of more than 200° C./s, the formation of a martensite phase is significant and a desired microstructure in which the bainite phase or the bainitic ferrite phase is a primary phase cannot be formed. Therefore, the average cooling rate is limited to 30° C./s to 200° C./s. Incidentally, it is preferably 40° C./s to 150° C./s.

The cooling stop temperature is 500° C. or lower in terms of surface temperature. When the cooling stop temperature is higher than 500° C., the formation of a ferrite phase is significant and it is difficult to form a desired microstructure in which a bainite phase or a bainitic ferrite phase is a primary phase. Incidentally, the cooling stop temperature is preferably 300° C. or higher in terms of surface temperature. After cooling is stopped, natural cooling is performed for a natural cooling time of more than 10 s.

When the natural cooling time after cooling is stopped is 10 s or less, a variation in hardness is large. Therefore, the natural cooling time after cooling is stopped is limited to more than 10 s.

After being naturally cooled, the hot-rolled sheet is coiled, whereby the hot-rolled steel sheet is obtained.

The coiling temperature is 400° C. to 620° C. When the coiling temperature is lower than 400° C., the strength is insufficient. In contrast, when the coiling temperature is higher than 620° C., a microstructure mainly containing bainitic ferrite is unlikely to be formed and the sour resistance and the toughness are reduced. Therefore, the coiling temperature is limited to a range between 400° C. and 620° C. Incidentally, it is preferably 400° C. to 600° C.

EXAMPLES

Each of molten steels having a composition shown in Table 1 was produced in a converter and was then cast into a slab (a steel material with a thickness of 220 mm) by a continuous casting process. The steel material was heated to a heating temperature shown in Table 2 and was then subjected to rough rolling and finish rolling under conditions shown in Table 2, whereby a hot-rolled sheet was obtained. After finish rolling was finished, cooling and coiling were immediately performed as shown in Table 2, whereby a hot-rolled steel sheet with a thickness shown in Table 2 was obtained.

Test specimens were taken from the obtained hot-rolled steel sheet and were subjected to microstructure observation, a tensile test, a hardness test, an HIC test, and an impact test. Test methods are as described below.

(1) Microstructure Observation

A test specimen for microstructure observation was taken from the obtained hot-rolled steel sheet. A cross section (L cross section) thereof in a rolling direction was polished, was corroded, was observed for five or more fields of view using an optical microscope or a scanning electron microscope (a magnification of 2,000×), and was then photographed. The type and fraction of a microstructure were determined by image processing.

(2) Tensile Test

A test specimen (GL: 50 mm) was taken from the obtained hot-rolled steel sheet in accordance with ASTM A370 such that a tensile direction coincided with a direction (C-direction) perpendicular to the rolling direction. The test specimen was subjected to the tensile test, whereby tensile properties (yield strength YS and tensile strength TS) thereof were determined.

(3) Hardness Test

A test specimen for hardness measurement was taken from the obtained hot-rolled steel sheet. The thickness-wise hardness distribution of a cross section (C-cross section) thereof was determined at 0.5 mm intervals in accordance with JIS Z 2244 using a Vickers hardness meter (a load of 10 kgf and a test force of 98 N), the cross section being perpendicular to the rolling direction, whereby the highest hardness (maximum hardness) $HV_{max}$ in a thickness direction and the hardness $HV_{1/2}$ of a thickness-wise center position were determined.

(4) HIC Test

A test specimen (a size of 10 mm (thickness)×20 mm (width)×100 mm (length)) was taken from the obtained hot-rolled steel sheet such that a length direction coincided with the rolling direction. The test specimen was subjected to the HIC test in accordance with NACE-TM0284. The test was as follows: the test specimen was bent by press bending so as to have a curvature of 150 mmR and was then immersed in a test solution for 96 h, the test solution being prepared by saturating Solution A (an aqueous solution containing 5% NaCl and 0.5% glacial acetic acid) with $H_2S$ gas at 0.1 MPa. After being immersed therein, a cross section of the test specimen was observed by an ultrasonic crack detection method, cracks were measured for size, and CLR (the total length of cracks/the length of the test specimen)×100% was determined. Cases with a CLR of 8% or less were evaluated to be good in HIC resistance and were rated as ○. The others were rated as x.

(5) Impact Test

V-notch test specimens were taken from the obtained hot-rolled steel sheet such that a length direction was perpendicular to the rolling direction. The test specimens were subjected to a Charpy impact test at a test temperature of −60° C. in accordance with JIS Z 2242, whereby the absorbed energy $vE_{-60}(J)$ was determined. Three of the test specimens were measured and the arithmetic average of the measurements was defined as the absorbed energy $vE_{-60}$ (J) of the steel sheet.

Obtained results are shown in Table 3.

TABLE 1

| Steel No. | Chemical components (mass percent) | | | | | | | | | | | | Value of left side of Inequality (1)* | Cm** | Remarks |
| --- | --- | --- | --- | --- | --- | --- | --- | --- | --- | --- | --- | --- | --- | --- | --- |
| | C | Si | Mn | P | S | Al | Nb | V | Ti | N | Mo, Cu, Ni, Cr, B, Zr | Ca, REM | | | |
| A | 0.045 | 0.23 | 0.88 | 0.010 | 0.001 | 0.023 | 0.04 | 0.04 | 0.02 | 0.0036 | — | — | 0.10 | 0.09 | Acceptable example |
| B | 0.050 | 0.22 | 1.13 | 0.005 | 0.001 | 0.036 | 0.05 | 0.07 | 0.01 | 0.0041 | — | — | 0.13 | 0.10 | Acceptable example |
| C | 0.038 | 0.31 | 1.27 | 0.006 | 0.001 | 0.031 | 0.06 | 0.002 | 0.02 | 0.0030 | Cu: 0.26, Ni: 0.23 | — | 0.082 | 0.10 | Acceptable example |
| D | 0.029 | 0.15 | 0.96 | 0.008 | 0.001 | 0.027 | 0.03 | 0.10 | 0.01 | 0.0024 | Mo: 0.20, B: 0.0005 | — | 0.14 | 0.10 | Acceptable example |
| E | 0.046 | 0.24 | 0.99 | 0.005 | 0.001 | 0.030 | 0.04 | 0.02 | 0.01 | 0.0028 | Cr: 0.23 | — | 0.07 | 0.09 | Acceptable example |
| F | 0.052 | 0.20 | 1.03 | 0.005 | 0.001 | 0.019 | 0.05 | 0.04 | 0.002 | 0.0033 | Zr: 0.024 | — | 0.092 | 0.10 | Acceptable example |

TABLE 1-continued

| | Chemical components (mass percent) | | | | | | | | | | | | | |
|---|---|---|---|---|---|---|---|---|---|---|---|---|---|---|
| Steel No. | C | Si | Mn | P | S | Al | Nb | V | Ti | N | Mo, Cu, Ni, Cr, B, Zr | Ca, REM | Value of left side of Inequality (1)* | Cm** | Remarks |
| G | 0.043 | 0.23 | 1.20 | 0.007 | 0.001 | 0.036 | 0.05 | 0.06 | 0.01 | 0.0030 | — | Ca: 0.019 | 0.12 | 0.10 | Acceptable example |
| H | 0.029 | 0.19 | 1.02 | 0.009 | 0.001 | 0.018 | 0.04 | 0.02 | 0.03 | 0.0028 | — | REM: 0.0030 | 0.09 | 0.07 | Acceptable example |
| I | 0.070 | 0.18 | 1.33 | 0.008 | 0.001 | 0.029 | 0.05 | 0.07 | 0.02 | 0.0020 | — | — | 0.14 | 0.13 | Comparative example |
| J | 0.040 | 0.24 | 1.16 | 0.009 | 0.001 | 0.032 | 0.08 | 0.07 | 0.01 | 0.0027 | — | — | 0.16 | 0.09 | Comparative example |
| K | 0.044 | 0.32 | 1.51 | 0.006 | 0.001 | 0.028 | 0.07 | — | 0.02 | 0.0037 | — | — | 0.09 | 0.11 | Comparative example |

*Nb + V + Ti < 0.15 ... (1)
**Cm = C + Si/30 + (Mn + Cu)/30 + Ni/60 + Mo/7 + V/10 ... (2)

TABLE 2

| | | Hot rolling | | | Post-rolling cooling | | | Coiling | | | |
|---|---|---|---|---|---|---|---|---|---|---|---|
| Steel Sheet No. | Steel No. | Heating temperature (° C.) | Cumulative rolling reduction (%)* | Finishing delivery temperature (° C.) | Average cooling rate (° C./s) | Cooling stop temperature (° C.) | Cooling time (s) | Coiling temperature (° C.) | Thickness (mm) | Remarks |
| 1 | A | 1220 | 44 | 820 | 60 | 470 | 16 | 530 | 12 | Example of present invention |
| 2 | A | 1220 | 48 | 800 | 38 | 300 | 12 | 490 | 19 | Example of present invention |
| 3 | A | 1200 | 66 | 825 | 16 | 470 | 6 | 460 | 14 | Comparative example |
| 4 | B | 1240 | 58 | 730 | 40 | 400 | 16 | 450 | 16 | Comparative example |
| 5 | B | 1180 | 58 | 795 | 40 | 330 | 17 | 550 | 16 | Example of present invention |
| 6 | C | 1180 | 48 | 820 | 32 | 300 | 21 | 510 | 21 | Example of present invention |
| 7 | C | 1200 | 54 | 840 | 38 | 480 | 12 | 650 | 19 | Comparative example |
| 8 | D | 1220 | 52 | 830 | 40 | 380 | 14 | 520 | 18 | Example of present invention |
| 9 | E | 1220 | 52 | 790 | 38 | 400 | 25 | 600 | 18 | Example of present invention |
| 10 | F | 1200 | 44 | 800 | 54 | 440 | 15 | 480 | 12 | Example of present invention |
| 11 | G | 1220 | 53 | 825 | 36 | 300 | 20 | 490 | 19 | Example of present invention |
| 12 | H | 1180 | 74 | 785 | 50 | 460 | 13 | 510 | 10 | Example of present invention |
| 13 | I | 1200 | 52 | 800 | 40 | 300 | 18 | 490 | 18 | Comparative example |
| 14 | J | 1220 | 58 | 830 | 42 | 410 | 17 | 480 | 16 | Comparative example |
| 15 | K | 1200 | 58 | 760 | 42 | 380 | 17 | 380 | 16 | Comparative example |

*Cumulative rolling reduction at a temperature of 930° C. or lower.

TABLE 3

| | | Microstructure | Tensile properties | | Hardness distribution | | Sour resistance | Toughness | |
|---|---|---|---|---|---|---|---|---|---|
| Steel Sheet No. | Steel No. | Type* BF area fraction (%) | Yield strength YS (MPa) | Tensile strength TS (MPa) | Maximum hardness $HV_{max}$ | Hardness of thickness-wise center $HV_{1/2}$ | HIC resistance CLR (%) | $vE_{-60}$ (J) | Remarks |
| 1 | A | BF 98 | 519 | 624 | 216 | 206 | 0 | 310 | Example of present invention |
| 2 | A | BF 99 | 538 | 642 | 220 | 209 | 5 | 278 | Example of present invention |
| 3 | A | BF 96 | 430 | 567 | 191 | 176 | 8 | 265 | Comparative example |
| 4 | B | BF 80 | 495 | 660 | 212 | 190 | 20 | 116 | Comparative example |
| 5 | B | BF 97 | 531 | 657 | 205 | 196 | 0 | 270 | Example of present invention |
| 6 | C | BF 98 | 554 | 662 | 217 | 207 | 0 | 297 | Example of present invention |
| 7 | C | PF 34 | 577 | 640 | 223 | 202 | 17 | 38 | Comparative example |
| 8 | D | BF 100 | 539 | 648 | 215 | 203 | 5 | 323 | Example of present invention |

TABLE 3-continued

| Steel Sheet No. | Steel No. | Type* | Microstructure BF area fraction (%) | Tensile properties | | Hardness distribution | | Sour resistance HIC resistance CLR (%) | Toughness $vE_{-60}$ (J) | Remarks |
|---|---|---|---|---|---|---|---|---|---|---|
| | | | | Yield strength YS (MPa) | Tensile strength TS (MPa) | Maximum hardness $HV_{max}$ | Hardness of thickness-wise center $HV_{1/2}$ | | | |
| 9 | E | BF | 98 | 528 | 661 | 219 | 210 | 3 | 225 | Example of present invention |
| 10 | F | BF | 95 | 553 | 625 | 220 | 201 | 6 | 257 | Example of present invention |
| 11 | G | BF | 97 | 520 | 652 | 219 | 206 | 0 | 264 | Example of present invention |
| 12 | H | BF | 97 | 533 | 640 | 210 | 199 | 3 | 240 | Example of present invention |
| 13 | I | BF | 92 | 592 | 695 | 312 | 238 | 33 | 175 | Comparative example |
| 14 | J | BF | 97 | 551 | 681 | 229 | 215 | 20 | 186 | Comparative example |
| 15 | K | BF | 95 | 527 | 694 | 262 | 217 | 27 | 277 | Comparative example |

*Type of main phase: BF is bainitic ferrite and PF is polygonal ferrite.

All examples of the present invention are thick high-strength hot-rolled steel sheets that have a thickness-wise maximum hardness of 220 HV or less, a high strength equivalent to Grade X65, that is, a yield strength of 450 MPa (65 ksi) or more, high toughness corresponding to a $vE_{-60}$ of 200 J or more, excellent sour resistance, and a thickness of 10 mm or more. However, comparative examples which are outside the scope of the present invention have insufficient strength, reduced toughness, or excessively high thickness-wise maximum hardness and therefore have reduced sour resistance.

The invention claimed is:

1. A thick high-strength hot-rolled steel sheet for electric resistance welded line pipe having excellent sour resistance, the thick high-strength hot-rolled steel sheet having a composition containing 0.01% to 0.07% C, 0.40% or less Si, 0.5% to 1.4% Mn, 0.015% or less P, 0.003% or less S, 0.1% or less Al, 0.01% to 0.15% Nb, 0.1% or less V, 0.03% or less Ti, 0.3% or less Mo, 0.5% or less Cu, 0.5% or less Ni, and 0.008% or less N on a mass basis, the remainder being Fe and inevitable impurities; Nb, V, and Ti satisfying the following inequality (1); Cm defined by the following equation (2) satisfying 0.12 or less; the thick high-strength hot-rolled steel sheet having a microstructure containing a bainite phase or bainitic ferrite phase at an area fraction of 95% or more, a thickness-wise maximum hardness of 220 HV or less, and a yield strength of 450 MPa or more:

Nb+V+Ti<0.15  (1)

Cm=C+Si/30+(Mn+Cu)/30+Ni60+Mo/7+V/10  (2)

where Nb, V, Ti, C, Si, Mn, Cu, Ni, Mo, and V are the content (mass percent) of each element.

2. The thick high-strength hot-rolled steel sheet for electric resistance welded line pipe according to claim 1, wherein the composition further contains one or more selected from the group consisting of 0.6% or less Cr, 0.001% or less B, and 0.04% or less Zr on a mass basis.

3. The thick high-strength hot-rolled steel sheet for electric resistance welded line pipe according to claim 1, wherein the composition further contains one or both of 0.005% or less Ca and 0.005% or less of an REM on a mass basis.

4. A method for manufacturing a thick high-strength hot-rolled steel sheet for electric resistance welded line pipe having excellent sour resistance and a yield strength of 450 MPa or more, the method comprising heating a steel material, subjecting the steel material to hot rolling comprising rough rolling and finish rolling to manufacture a hot-rolled sheet, cooling the hot-rolled sheet after the hot rolling is finished, and then coiling the hot-rolled sheet, wherein the steel material has a composition containing 0.01% to 0.07% C, 0.40% or less Si, 0.5% to 1.4% Mn, 0.015% or less P, 0.003% or less S, 0.1% or less Al, 0.01% to 0.15% Nb, 0.1% or less V, 0.03% or less Ti, 0.3% or less Mo, 0.5% or less Cu, 0.5% or less Ni, and 0.008% or less N on a mass basis, the remainder being Fe and inevitable impurities; Nb, V, and Ti satisfy the following inequality (1); Cm defined by the following equation (2) satisfies 0.12 or less; the heating temperature before the hot rolling ranges from 1,100° C. to 1,250° C.; the finish rolling is one in which the total rolling reduction at a temperature of 930° C. or lower is 40% to 85% and the finish rolling temperature is 760° C. to 870° C.; the cooling is performed to a cooling stop temperature of 500° C. or lower in terms of surface temperature at an average cooling rate of 30° C./s to 200° C./s in terms of thickness-wise center temperature, followed by natural cooling for more than 10 s after the cooling is stopped; and the coiling is performed at a coiling temperature of 400° C. to 620° C.;

Nb+V+Ti<0.15  (1)

Cm=C+Si/30+(Mn+Cu)/30+Ni/60+Mo/7+V/10  (2)

where Nb, V, Ti, C, Si, Mn, Cu, Ni, Mo, and V are the content (mass percent) of each element.

5. The method for manufacturing the thick high-strength hot-rolled steel sheet for electric resistance welded line pipe according to claim 4, wherein the composition further contains one or more selected from the group consisting of 0.6% or, less Cr, 0.001% or less B, and 0.0496 or less Zr on a mass basis.

6. The method for manufacturing the thick high-strength hot-rolled steel sheet for electric resistance welded line pipe according to claim 4, wherein the composition further contains one or both of 0.005% or less Co and 0.005% or less of an REM on a mass basis.

7. The thick high-strength hot-rolled steel sheet for electric resistance welded line pipe according to claim 2, wherein the composition further contains one or both of 0.005% or less Ca and 0.005% or less of an REM on a mass basis.

8. The method for manufacturing the thick high-strength hot-rolled steel sheet for electric resistance welded line pipe according to claim 5, wherein the composition further contains one or both of 0.005% or less Ca and 0.005% or less of an REM on a mass basis.

* * * * *